United States Patent Office 2,938,930
Patented May 31, 1960

2,938,930

PREPARATION OF CHLORMETHYLATED ALKYL AROMATIC HYDROCARBONS

Benjamin R. Harris, Glencoe, Ill., assignor, by mesne assignments, to Continental Oil Company, Ponca City, Okla., a corporation of Delaware No Drawing. Filed Feb. 23, 1954, Ser. No. 412,107

4 Claims. (Cl. 260—651)

This invention relates to a new and useful method of preparing chlormethylated alkyl aromatic hydrocarbons which are useful as intermediates in the production of various compounds, particularly germ-counteracting agents. The chlormethylated alkyl aromatic hydrocarbons which can effectively be produced by the present invention can be represented by the formula $$(R-)_xAr-CH_2Cl$$

where R is a higher alkyl radical, particularly one containing from 12 to 18 carbon atoms, $x$ is 1 or 2 and particularly 1, and Ar is benzene, naphthalene, or lower alkyl-substituted benzene or naphthalene where the number of said lower alkyl radicals does not exceed 3 and in which the number of carbon atoms in each of said lower alkyl radicals is from 1 to 4.

Illustrative chromethylated alkyl aromatic hydrocarbons which can readily be prepared in good yields in accordance with the present invention are the following:

(1) 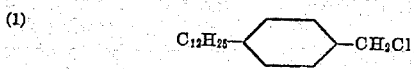

(2) 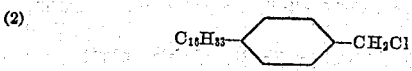

(3) 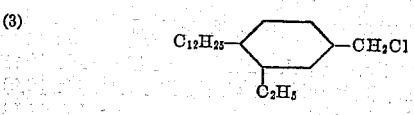

(4) 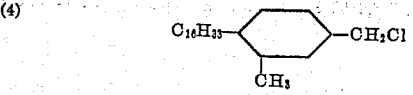

(5) 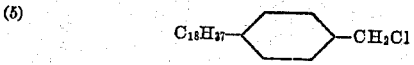

(6) 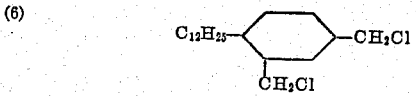

(7) 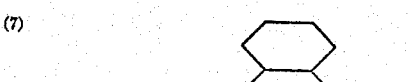

(8) 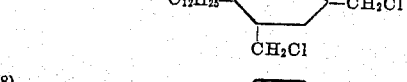

(9) 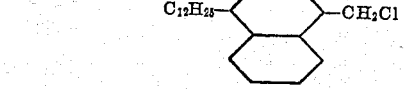

(10) 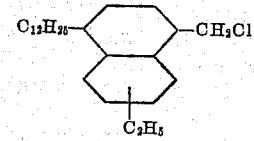

Various methods have heretofore been suggested for the preparation of chlormethylated aromatic hydrocarbons but they have been deficient in one or more particulars in relation to ease of carrying out the method, production of side reactions with resulting contamination of the desired product and the consequent introduction of unsatisfactory purification procedures, and with respect to percentage yields of the desired end product.

In accordance with my invention, a highly effective method has been evolved which comprises reacting a previously produced higher alkyl benzene or lower alkylated higher alkyl benzene or naphthalene, for instance a kerylbenzene whose keryl group is derived from a petroleum hydrocarbon distillate, with acetic acid, notably glacial acetic acid, in the presence of formaldehyde, particularly paraformaldehyde or trioxymethylene, and in the presence of an anhydrous condensing agent, especially zinc chloride, ferric chloride, or aluminum chloride, the reaction being carried out at relatively low temperatures, for example, of the order of 60 to 65 degrees C., cooling being employed if necessary. In carrying out this reaction, the aforementioned ingredients are intermixed and a brisk stream of dry hydrogen chloride gas is introduced into the stirred mixture while maintaining it at the aforementioned temperatures with occasional cooling, if necessary. To recover the chlormethylated alkyl aromatic hydrocarbon, the reaction mixture is then cooled, petroleum ether added thereto, and the mixture is then allowed to settle. The lower layer is discarded and the top layer can be washed with 10% sodium hydroxide solution and then with water. The petroleum ether solution is then dried over anhydrous sodium sulfate and the ether is distilled off.

The examples hereinafter set forth are illustrative of the practice of the method. It will be understood that proportions of ingredients and temperatures and times of reaction may be varied; that different combinations of reactants may be utilized; and that various processes of purification and the like may be resorted to wherever found desirable or convenient. These and other variations and modifications will be clear to those versed in the art in the light of the guiding principles which are disclosed herein.

*Example 1*

80 grams of monolauryl benzene, 29 grams of glacial acetic acid, 17 grams of anhydrous zinc chloride, and 14 grams of paraformaldehyde were heated, with stirring, to 55–65 degrees C. Then a brisk stream of dry hydrogen chloride gas was introduced into the stirred mixture which was maintained at 55–65 degrees C. by occasional cooling. The hydrogen chloride stream was stopped after about 16 grams of gas had been absorbed. The mixture was then cooled, 120 grams of petroleum ether were added and the material was allowed to settle. The lower layer which contained practically all of the zinc was discarded. The top layer was washed with 80 grams of a 10% sodium hydroxide solution and then with 100 cc. of water. The petroleum ether solution was then dried over anhydrous sodium sulfate and the solvent distilled off.

*Example 2*

100 grams of redistilled dodecyl naphthalene, 30 grams of glacial acetic acid, 18 grams of anhydrous zinc chloride, and 14 grams of paraformaldehyde were heated, with stirring, to 60–65 degrees C. Then a brisk stream of dry hydrogen chloride gas was introduced into the stirred mixture which was maintained at 60–65 degrees C. by occasional cooling. The hydrogen chloride stream was stopped after about 17 grams of gas had been absorbed. The mixture was then cooled, 120 grams of petroleum ether were added and the material was allowed to settle. The lower layer which contained practically all of the zinc was discarded. The top layer was washed with 80 grams of a 10% sodium hydroxide solution and then with 100 cc. of water. The petroleum ether solution was then dried over anhydrous sodium sulfate and the solvent distilled off. The weight of the residue was 120 grams.

The aliphatic (including cycloaliphatic) radical represented by R in the general formula set forth above is straight chain or branched chain, substituted or unsubstituted, and saturated or unsaturated. It is particularly preferred that it be a straight chain, saturated alkyl radical containing from 12 to 18 carbon atoms, especially from 12 to 16 carbon atoms. Representative examples of such radicals are dodecyl, tetradecyl, hexadecyl, octadecyl, 2-butyloctyl, 2-butyltetradecyl, mixtures thereof, or mixtures derived from petroleum hydrocarbons, and the like. Olefins which may, for example, be used as a source of alkyl radicals include, for example, pressure distillate, cracked distillate, and mixtures of olefin polymers and the like, such as tetrapropylene, mixtures of such olefins containing from 12 to 18 carbon atoms and being particularly rich in $C_{12}$ to $C_{15}$ mono-olefins.

The radical represented by Ar in the general formula set forth above is benzene or naphthalene or lower alkyl-substituted benzenes or naphthalenes as, for example, toluene, ethyl benzene and ispropyl benzene, isopropyl naphthalene, butyl naphthalene and the like. Particularly satisfactory results are obtained where the Ar radical is toluene or unsubstituted benzene or naphthalene.

While the invention has been described in detail, the scope thereof is not to be limited other than is set forth in the claims.

This application is a continuation-in-part of my prior application Serial No. 305,710, now U.S. Patent 2,678,-316, filed August 21, 1952, which, in turn, is a continuation-in-part of application Serial No. 702,893, filed October 12, 1946, and now abandoned.

What I claim is new and desire to protect by the Letters Patent of the United States is:

1. A method of chlormethylating a mono-alkyl aromatic hydrocarbon in which said alkyl radical is a higher molecular weight alkyl radical containing not more than 18 carbon atoms, said aromatic hydrocarbon being selected from the group consisting of benzene, naphthalene, and lower alkyl-substituted benzene and naphthalene in which the number of said lower alkyl radicals does not exceed 3 and in which the number of carbon atoms in each of said lower alkyl radicals is from 1 to 4, said method comprising reacting said higher mono-alkyl aromatic hydrocarbon with formaldehyde and hydrogen chloride in the presence of an anhydrous condensing agent and glacial acetic acid, and recovering the resulting chlormethylated higher mono-alkyl aromatic hydrocarbon from the reaction mixture.

2. A method which comprises reacting mono-alkyl hydrocarbon in which said alkyl radical is a higher molecular weight alkyl radical containing not more than 18 carbon atoms, said aromatic hydrocarbon being selected from the group consisting of benzene, naphthalene, and lower alkyl-substituted benzene and naphthalene in which the number of said lower alkyl radicals does not exceed 3 and in which the number of carbon atoms in each of said lower alkyl radicals is from 1 to 4, with paraformaldehyde, glacial acetic acid and anhydrous zinc chloride, and then passing dry hydrogen chloride into said mixture whereby to effect chlormethylation of said mono-alkyl aromatic hydrocarbon.

3. A method which comprises chlormethylating an alkyl aromatic hydrocarbon in which said alkyl radical is a higher molecular weight alkyl radical containing not more than 18 carbon atoms by contacting said alkyl aromatic hydrocarbon with formaldehyde and hydrogen chloride in the presence of anhydrous zinc chloride and glacial acetic acid, and recovering the resulting chlormethylated alkyl aromatic hydrocarbon from the reaction mixture.

4. A method which comprises reacting an alkyl aromatic hydrocarbon in which said alkyl radical is a higher molecular weight alkyl radical containing not more than 18 carbon atoms with paraformaldehyde, glacial acetic acid and anhydrous zinc chloride, and then passing dry hydrogen chloride into said mixture, whereby to effect chlormethylation of said alkyl aromatic hydrocarbon.

References Cited in the file of this patent

UNITED STATES PATENTS

| | | |
|---|---|---|
| 2,268,126 | Orthner et al. | Dec. 30, 1941 |
| 2,525,778 | De Benneville et al. | Oct. 17, 1950 |
| 2,676,987 | Lewis et al. | Apr. 27, 1954 |